Sept. 10, 1968 J. S. WENZEL 3,400,533
OPPOSED CYLINDER TWO-CYCLE ENGINE
Filed Oct. 31, 1966 3 Sheets-Sheet 1
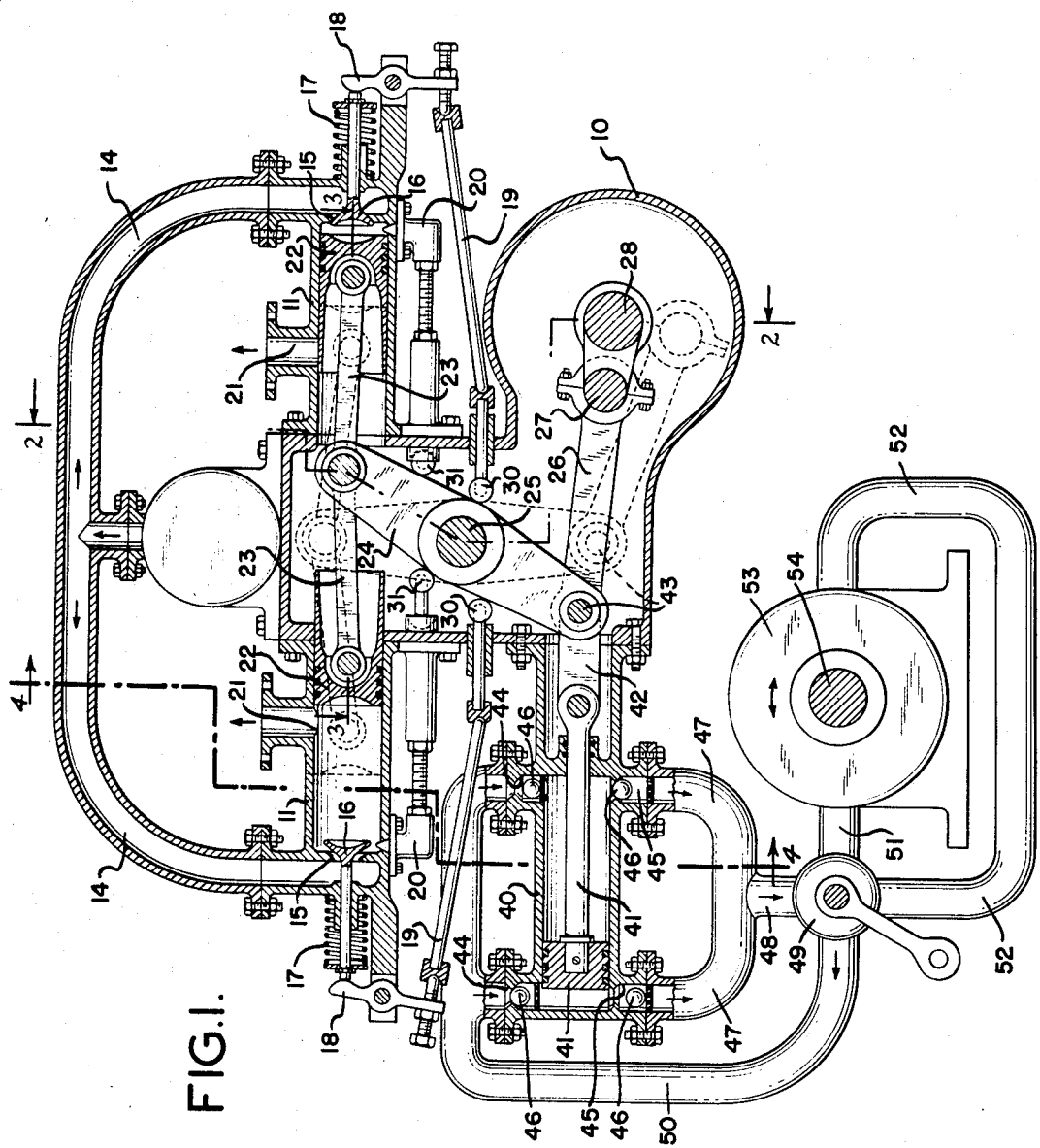
FIG.I.
INVENTOR
John S. Wenzel
BY
ATTORNEYS Sept. 10, 1968   J. S. WENZEL   3,400,533
OPPOSED CYLINDER TWO-CYCLE ENGINE
Filed Oct. 31, 1966   3 Sheets-Sheet 2
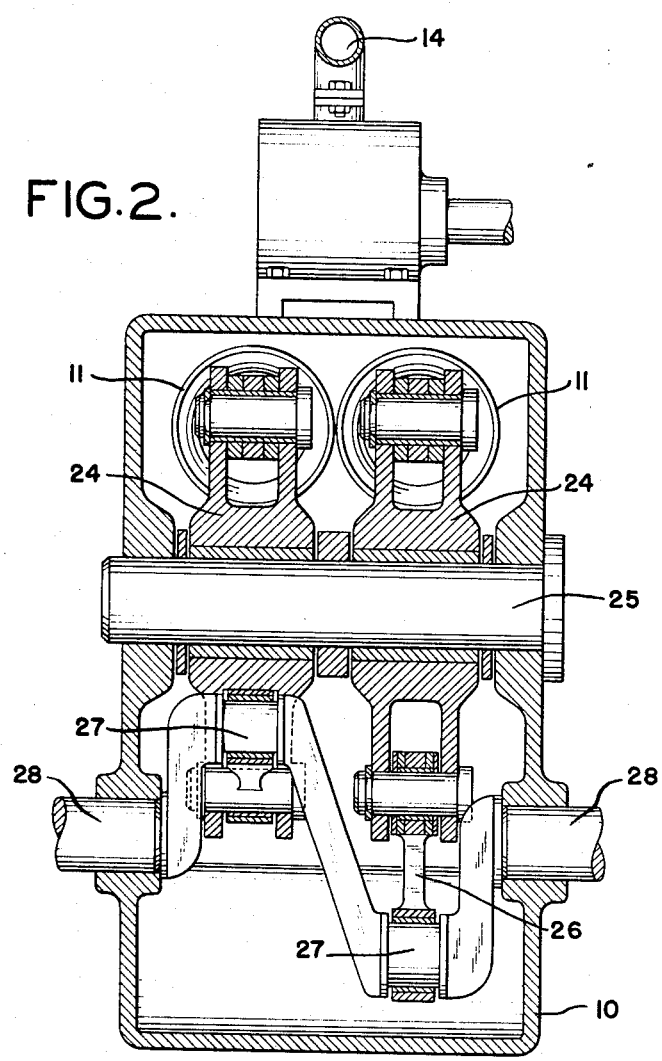
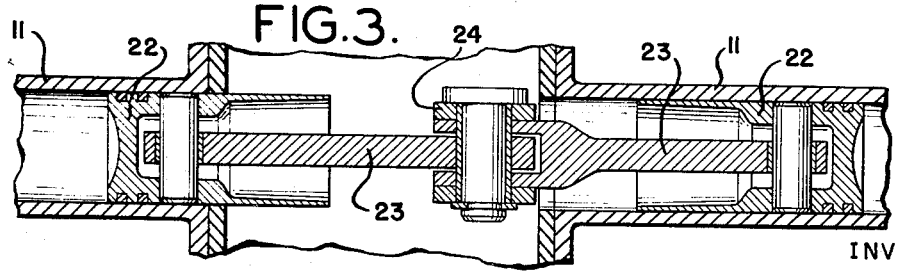
INVENTOR
John S. Wenzel
BY
ATTORNEYS

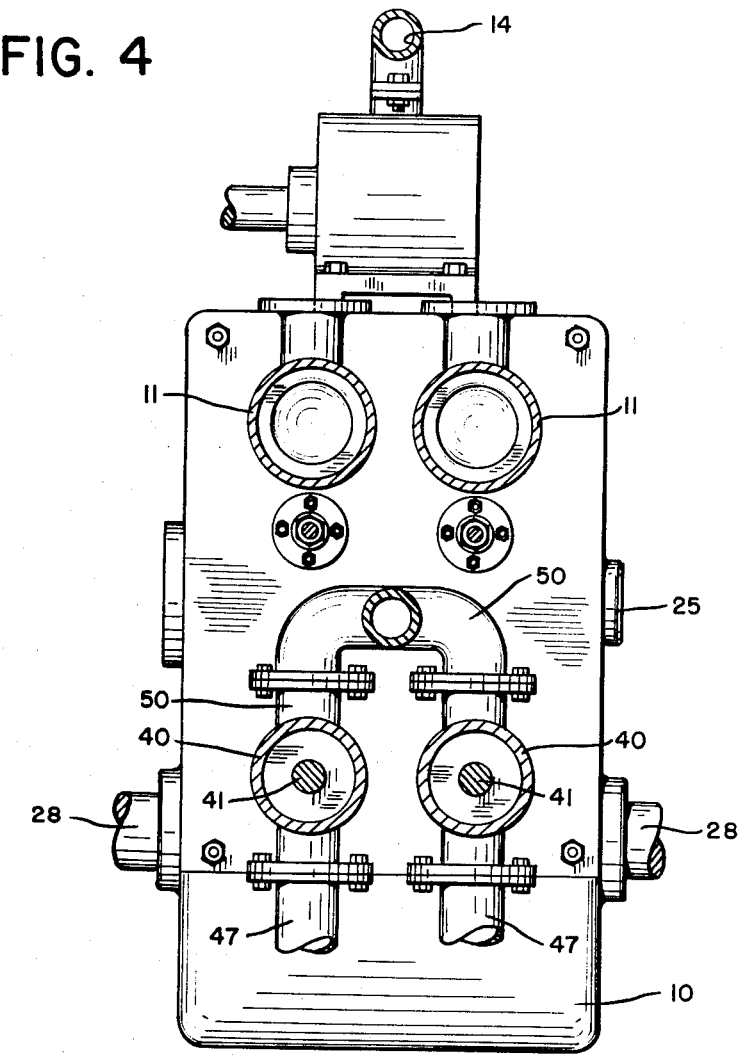

3,400,533
OPPOSED CYLINDER TWO-CYCLE ENGINE
John S. Wenzel, Willimantic, Conn., assignor of thirty-three and one-third percent each to Marjorie L. Barnett, New York, and Helen W. Tonken, Massapequa Park, N.Y.
Filed Oct. 31, 1966, Ser. No. 590,647
4 Claims. (Cl. 60—19)

This invention relates generally to a power system and more particularly to an opposed cylinder internal combustion engine operatively connected to a fluid output motor by a closed hydraulic circuit.

A problem existing in conventional reciprocating type internal combustion engines arises from the use of a crank-shaft to convert the linear motion of the pistons into the desired rotational motion of the drive shaft. In order to accommodate the high torque forces required to power heavy machinery, a heavy and carefully machined crankshaft must be used.

The crankshaft must be massive to provide sufficient structure to withstand the large pulsating loads imparted to the crank throws of the crankshafts by the piston rods. These forces, acting at a distance from the axis of the shaft, create a high twisting movement in the shaft providing the useful torque at the power takeoff end of the shaft.

In addition to being massive to withstand the high and uneven torque forces, a crankshaft must be carefully milled and balanced; a time consuming and expensive process. The heavy crank throws, being some distance from the axis of rotation of the shaft, creates a radially acting centrifugal force having vertical and horizontal components which alternate during each revolution from a maximum force in one direction through zero to a force of the same magnitude but in the opposite direction. Unless carefully balanced, these forces will cause vibrations resulting in unpleasant noise, and damage to the bearings supporting the shaft.

Furthermore, the centrifugal forces of the heavy crank throws create bending movements and shear forces tending to deform the shaft thereby establishing undesirable radial loads in the bearings.

A still further difficulty with conventional reciprocating engines having fuel injector means is that the means for actuating the inlet valves and fuel injection mechanisms are often driven by a separate drive train compressing cam shafts connected by gearing to the drive shafts thus necessitating extra structure and so increasing the cost of the engine.

It is therefore an object of my invention to provide for a power system having an internal combustion engine of a design which eliminates the need of a heavy and expensive crankshaft.

A further object of the invention is to provide for inlet valve actuation means and fuel injector actuation means which eliminates need of separate drive trains in the form of cam shafts.

Additional objects of my invention are to increase the efficiency and reduce the cost of an internal combustion engine.

Broadly, I provide for an opposed cylinder internal combustion engine which converts the linear motion of the pistons into useful torque by means of a fluid motor and pump instead of the usual crankshaft. The engine comprises an opposed cylinder two-stroke internal combustion engine in which a rocker beam operatively connects the piston rods to a fluid pump, which in turn, actuates a fluid power take-off motor. In addition, the rocker beam directly operates the inlet valve and fuel injection actuating means.

Further objects and advantages of the invention will become apparent as the following description proceeds, taken in connection with the accompanying drawings, in which:

FIG. 1 is a partial longitudinal sectional view of a power system embodying the invention;

FIG. 2 is an enlarged transverse sectional view taken along line 2—2 of FIG. 1;

FIG. 3 is a horizontal section illustrating the inter-relationship of one of the pairs of opposed pistons; and FIG. 4 is an enlarged transverse sectional view taken along the line 4—4 of FIG. 1.

Referring to FIG. 1, there is illustrated an internal combustion engine having a housing or casing 10 which may contain a lubricant and serves as a crankcase. Projecting laterally from the upper portion of the casing are aligned pairs of opposed cylinders 11. As shown in FIGS. 2 and 4, two such pairs of cylinders are provided. Although it will be apparent that any desired number of such cylinder pairs could be used, it is preferred that the cylinder be arranged in multiples of four for reasons that will be made clear hereinafter.

The engine, as shown, is designed to operate on a two stroke cycle. Therefore, the outer end of each cylinder is connected to an air supply passageway 14 by means of intake port 15. The admission of air through the port 15 is controlled by a poppet type valve 16 which is urged to seat on a valve seat surrounding the intake port by spring 17. Rocker arms 18 and push rods 19 provide a means for operating the valves, as is described below.

In addition to the air intake port, each cylinder is provided with a fuel injection mechanism 20 for injecting fuel and air. Exhaust of the burned mixture from the cylinder is provided by a passageway and exhaust port 21 located on the cylinders adjacent their inner ends. A piston 22 is slidably mounted in each cylinder having an elongated skirt to close the exhaust ports 21 when the piston is in its uppermost position. Pistons 22 are joined by means of connecting rods 23 to one end of a rocker beam 24 which is mounted for oscillation about the rocker beam shaft 25.

A connecting rod 26 connects the opposite end of beam 24 to a crankpin 27 of a rotary crankshaft 28. It is to be noted that crankshaft 28 limits the oscillatory movement of the rocker beam 24 and subsequently the stroke of the pistons 22 in the cylinders 23. It is apparent from inspection of FIGURE 1 that as one piston moves downwardly on a power stroke, that the opposite piston will move upwardly on a compression stroke so that inertia forces caused by one piston moving in one direction are to a large extent absorbed by the opposite piston moving in the opposite direction. Thus, no means has to be provided as in the case of conventional in line engines to absorb the large inertia forces caused by parts moving in reciprocal directions which, as described above, requires the use of comparatively massive crankshafts.

The oscillation of the rocker beam is utilized to drive the actuating mechanisms for the push rods controlling the opening of the inlet valves and for actuating the fuel injection means 20. As shown in FIG. 1, cam followers 30 are positioned to bear on the surface of the rocker beam so that as the rocker beam oscillates about shaft 25, the cam followers will move in upward and downward directions to in turn move the push rods 19 and inlet valves 16. Cam followers 31 also bear on the surface of the rocker beam to actuate the fuel injector means 20.

A pump cylinder 40 which has a piston 41 movable therein projects from casing 10 and serves as a fluid pump for a closed hydraulic system as is more fully described below. Piston 41 is operatively connected to an end of the beam 24 by a piston rod 42 and connecting rod 43 so that the piston will move to each end of cylinder 40 upon each oscillation of the beam. Inlet ports 44 and outlet ports 45 are located at opposite ends of the cylinder on both sides of the piston and provide means for the entry and discharge of hydraulic fluid from the cylinder. Ball checks 46 are provided in each of the inlet and outlet ports to control flow therethrough.

The outlet ports lead into ducts 47 which join into a single duct 48 which leads to a four-way valve 49. The inlet ports are connected by means of duct 50 to the four-way valve. Ducts 51 and 52 extend from valve 49 to a fluid motor 53 such that upon operation of the four-way valve, fluid may enter the motor through duct 51 and exit by duct 52, or vice versa, such that the direction of rotation of the output shaft 54 may be controlled. Further, the four-way valve 49 may be turned to an intermediate position to connect duct 48 directly with duct 50 such that the fluid motor will be rendered inoperative with the power system thus in a neutral operating condition.

It is seen that the above described hydraulic system provides a closed circuit such that there is no need for a sump or a reservoir thereby reducing energy losses which would normally result from circulation of fluid through a sump and further reducing need of a separate pump means for returning hydraulic fluid from a sump to a reservoir.

Preferably there is one hydraulic pump in the hydraulic system for each pair of opposed cylinders 11 and further, the internal combustion engine should have any multiples of four power cylinders. By having this arrangement, the difference in effective cross-sectional area of the two sides of the piston 41 due to the piston rod is compensated for such that the total force exerted on the fluid motor will be the same notwithstanding the direction of movement of the pump pistons.

The crankshaft 28 as shown in FIGS. 1 and 2 may be comparatively light in construction since it does not, as explained above, have to absorb large inertia or torsional forces. If desired, its rotary motion may be used to drive accessory equipment such as blowers, lubrication pumps or generators which require small amounts of power and which would result in only small additional torsional forces being added to the crankshaft.

The internal combustion engine illustrated in FIG. 1 depends upon the compression of the fuel mixture within the cylinder to ignite the mixture. It is apparent that spark plugs could also be used to ignite the mixture.

The complete cycle of operation of the power system is as follows. A fresh charge of air is forced into the left-hand cylinder through open inlet port 15 as illustrated in FIG. 1 from the inlet duct 14 by a blower means, not shown, to scavenge the exhaust gases through the open exhaust port 21. At the same time, a charge of air in the right cylinder will have been fully compressed and fuel forced into the cylinder to form a combustible mixture which will be ignited at the critical compression of the mixture which is arrived at as the piston approaches the outer limit of its stroke.

The resulting burning and expansion of the fuel gas mixture will drive the right-hand piston 22 to the left and cause the rocker beam 24 connected thereto to rotate in a counter clockwise direction about shaft 25, thereby forcing the pump piston 41 to the right. As the pressure of the fluid in the pump cylinder is increased, the ball check at the right end of the cylinder will close while the ball check in the lower right end will open. Simultaneously, the reduction of fluid pressure in the left-hand side of the pump cylinder will cause the ball check at the lower left end of the cylinder to close and the upper left ball check to open. As the pump piston travels the length of the cylinder, fluid will be forced into the fluid motor 53 thereby rotating the output shaft 54.

As the charge in the right-hand cylinder 11 is burning and expanding and as the piston 22 travels to the left, the fresh charge in the left-hand cylinder 11 will be compressed. During this operation the inertia of the pistons and the rocker beam 24 attached thereto will be dissipated as the fresh charge is compressed so that the end of the working stroke, the moving members will come to rest in preparation for a reversal in motion as the fresh charge is ignited. Thus, substantially all of the energy imparted to the pistons is utilized in useful work, producing a highly efficient engine.

By having the inertia of the pistons substantially absorbed in the manner previously described, it is possible to provide the pistons with an extremely long stroke relative to the piston diameter. This allows the burning mixture to be fully expanded prior to the opening of the exhaust ports thereby further increasing the engine efficiency.

Due to the arrangement of the cylinders in opposed pairs, it is possible to obtain a well-balanced and smooth running engine by simultaneously firing cylinders on opposite sides of the engine. For example, in a four cylinder engine as shown in FIGS. 2 and 4, the left cylinder of one pair could be fired simultaneously with the cylinder on the right side of the second pair. In this way, the forces are maintained in balance so that the engine runs smoothly at all speeds.

It is to be understood that the form of my invention, herewith shown and described, is to be taken as a preferred example of the same, and that various changes in the shape, size and arrangement of parts may be resorted to, without departing from the spirit of the invention, or the scope of the appended claims.

I claim:

1. A power system comprising an internal combustion engine having at least one pair of opposed cylinders, a movable piston in each cylinder, stroke limiting means for limiting the stroke of each said piston, a rocker beam mounted for oscillation between each pair of opposed cylinders, a connecting rod connected at one end to each said piston and at its other end to an end of said rocker beam, a fluid pump operatively connected to an opposite end of said rocker beam for converting the oscillatory movement of said beam into fluid pressure, and a fluid power take-off motor connected to said pump by a closed hydraulic circuit.

2. A power system according to claim 1 wherein said engine is of the two-cycle type having an air inlet valve and fuel injecting means in each said cylinder, a fuel injector pump connected with each said injecting means, valve lifting mechanism for opening and closing each said inlet valve, and push rods for operating each said valve lifting mechanism and fuel injector pump; the push rods for operating the fuel injector pump and valve lifting mechanism for each pair of opposed cylinders engaging the rocker beam positioned between said pair of cylinders whereby oscillatory movement of said beam imparts reciprocating linear movement to said push rods.

3. A power system according to claim 1 wherein said fluid pump comprises a pump cylinder, a linearly movable pump piston in said pump cylinder connected to said rocker beam by a pump connecting rod, and unidirectional fluid inlet and outlet valves positioned in each end of said cylinder on opposite sides of said piston whereby each stroke of the pump piston will be a working stroke to cause an increase in fluid pressure.

4. A power system according to claim 1 wherein said stroke limiting means comprises a rotatable crank shaft operatively connected to an end of each said rocker beam opposite the end connecting with the piston connecting rod.

References Cited

UNITED STATES PATENTS

| 345,998 | 7/1886 | Smith | 230—56 |
| 2,393,882 | 1/1946 | Blair | 60—19 |

FOREIGN PATENTS 497,005  12/1938  Great Britain.

EDGAR W. GEOGHEGAN, *Primary Examiner.*